United States Patent [19]

Speirs et al.

[11] Patent Number: 5,356,654
[45] Date of Patent: Oct. 18, 1994

[54] GELLING SYSTEM

[75] Inventors: Charles Speirs, Wissendine; Karen E. White, Melton Mowbray, both of United Kingdom

[73] Assignee: Mars G.B. Limited, Slough, United Kingdom

[21] Appl. No.: 838,455

[22] PCT Filed: Sep. 26, 1990

[86] PCT No.: PCT/GB90/01477
§ 371 Date: Mar. 11, 1992
§ 102(e) Date: Mar. 11, 1992

[87] PCT Pub. No.: WO91/04674
PCT Pub. Date: Apr. 18, 1991

[30] Foreign Application Priority Data

Sep. 26, 1989 [GB] United Kingdom ............ 89 21658.4

[51] Int. Cl.$^5$ ............... A23L 1/0532; A23L 1/0524
[52] U.S. Cl. ................................ 426/575; 426/577
[58] Field of Search ............ 426/573, 574, 575, 577, 426/802, 803

[56] References Cited

U.S. PATENT DOCUMENTS

| 2,786,764 | 3/1957 | Rivoche. | |
|---|---|---|---|
| 3,455,701 | 7/1969 | Miller et al. | 426/575 |
| 3,973,051 | 8/1976 | Buckley et al. | 426/577 |
| 4,143,172 | 3/1979 | Mitchell et al. | 426/577 |
| 4,347,261 | 8/1982 | Challen et al. | 426/575 |
| 4,560,570 | 12/1985 | Rausing | 426/575 |

FOREIGN PATENT DOCUMENTS

| 191572 | 8/1986 | European Pat. Off. . | |
|---|---|---|---|
| 9104674 | 4/1991 | European Pat. Off. | 426/575 |
| 2114706 | 6/1972 | France . | |
| 2267711 | 11/1975 | France . | |

Primary Examiner—Jeanette Hunter
Attorney, Agent, or Firm—Curtis, Morris & Safford

[57] ABSTRACT

Alginate and/or pectate gels are produced by forming an aqueous mixture of a water soluble or water dispensible alginate and/or pectate, a calcium ion sequestrant and a sparingly soluble calcium ion source at low temperature and heating the mixture to cause gelation thereof. Sequestrant is preferably sodium or potassium pyrophosphate but at least part of the sequestrant may be replaced by meat having calcium ion sequestring activity. The calcium ion source is preferably calcium sulphate dihydrate. Preferably the mixture is heated to at least 50° C. to induce gelation.

18 Claims, No Drawings

GELLING SYSTEM

This invention relates to a gelling system and more particularly to alginate and/or pectate gelling systems.

The application of calcium alginate gels is widespread in the food and textile processing industries. The ability to control gel formation by the metered addition of calcium ions to a alginate solution or vice versa gives a variety of products such as dental moulds, moulded products and structured foods.

The literature teaches that conventional alginate reforming techniques depend on a balanced interplay between three principle components, namely alginate, calcium ions, and optionally sequestrant. Judicious balancing of the components will give a range of setting conditions and product opportunities.

The literature describes what is known in the art as "coldforming" techniques and it is generally considered that calcium alginate and calcium pectate gels can only be formed in the temperature range 0°–50° C. Indeed it has been reported in the technical literature of alginate manufacturers that the mechanisms responsible for calcium alginate gel formation are thermodynamically unstable at temperatures much above 50° C.

Many processes for the production of alginate gelled products by contracting shaped pieces of alginate containing material with calcium ions are known.

GB-A-1,328,263 for example, teaches that drops of fruit puree containing alginate can be fed into a stream of yoghurt containing calcium ions such that gelled drops of simulated fruit pieces in the yoghurt are formed.

Fruit pieces are also described in NL-A-7, 7302, 275. Gelled fruit pieces are obtained by extruding alginate containing fruit puree into a calcium solution and preferably cutting the extrudate into small pieces whilst in the calcium solution. The patent also mentions that heating the pieces to 70°–100° C. in an aqueous sugar syrup containing 0.1–0.5% calcium salt prevent gelation of the core.

U.S. Pat. No. 3,650,766 describes the formation of reformed onion rings from minced onion and sodium alginate extruded into a spray of calcium chloride and then cut off into pieces. The pieces can then be coated with a batter containing calcium ions and fried.

Another method of producing a foodstuff is described in GB-A-2,170,092 and comprises bringing together two or more slurries, one of which contains alginate and the other contains a soluble calcium salt in such a way that randomly shaped pieces of gelled alginate foodstuff are formed in the calcium phase by continually exposing an ungelled surface to calcium ions. This method can be used to make simulated meat and fruit pieces.

In each of the above processes rapid gelling occurs only on the surface of the product on contact with the calcium ions and complete gelling is only achieved over a period of some hours probably as a result of calcium ion migration.

GB-A-1,525,123 describes the formation of a calcium pectate gel on cooling of a heat processed system consisting of a mixture of sodium pectate and calcium ions and optionally a calcium ion sequestraint. In this process gelling occurs throughout the product as the mixture cools. From the literature it appears that cellulose ethers are the only major group of materials that will form a gel on heating but such gels liquefy again on cooling.

For may applications, it would be desirable to have a gelling system that can be formed at ambient temperature and that is stable for a considerable length of time without substantial gel formation until it is heated above a threshold temperature, above which temperature a gel is rapidly formed throughout the product, the gel structure being retained on cooling.

This invention is based on the surprising observation that such properties can be produced in gelling systems based on alginate and/or pectate and calcium ions if a thermolabile calcium ion sequestrant is present in the system, a sparingly soluble calcium ion source is used and the amounts of sequestrant and calcium ion are suitably chosen.

By "thermolabile sequestrant" is meant a sequestrant that will strongly sequester calcium ions at temperature below the threshold temperature but at least partially loses its sequestring power above that temperature to release calcium ions rapidly to make them available to interact with the alginate or pectate to cause gelation.

It has, moreover, been found that gelation can be substantially instantaneous above the threshold temperature although the gelling time can be adjusted by selection of the components of the system and the amounts in which they are present. Gelling will occur very slowly at ambient temperature if the system is allowed to stand but the system of the invention allows the ingredients of a product to be mixed together and kept for periods of up to a number of hours prior to being used.

As thermolabile sequestrants there are especially used sequestrants with polyvalent anions, more especially phosphates, for example sodium or potassium pyrophosphates.

Certain natural materials have intrinsic sequestrant properties. Animal skeletal muscle-rich meats and some other foodstuffs have, for example a calcium ion binding capacity and thus the inclusion of say minced beef steak or minced cod to a formulation containing alginate and or pectate and calcium ions may reduce the amount of sequestrant required. Certain muscle rich meats have a very high sequestring activity and if present it may be possible to operate without added sequestrants. The total amount of sequestrant and/or material having sequestrant properties present in the system should be at least that amount required to sequester substantially all the available calcium ions in the system prior to heating to above the threshold temperature.

The amount of sequestrant used will depend on the sequestring activity of any given sequestrant, the higher the activity the less the amount that can be used. It is preferable however for the purposes of the invention that added sequestrant be present in a meat containing system since this allows greater flexibility of operation.

For example, in an aqueous system using calcium sulphate dihydrate as calcium ion source and sodium or potassium pyrophosphate as sequestrant, the sequestrant should be present in an amount within the range of 5 to 70% and preferably from 10 to 40% more especially about 30% by, weight, calculated on the weight of calcium sulphate dihydrate.

In a system containing added meats and using calcium sulphate dihydrate and sodium or potassium pyrophosphate as sequestrant, the amount of sequestrant is preferably within the range of 1 to 55%, preferably 1 to 15%, more especially about 1 to 4%, by weight calculated on the weight of calcium sulphate dihydrate, although the amount of sequestrant used will depend on the sequestring activity of the meat.

As is conventional in the art, the preferred amount of alginate and/or pectate in the system to be gelled is from 0.2 to 6%, more preferably 0.5% to 2% by weight of the system. As alginate or pectate the sodium or potassium salts are preferred.

As sparingly soluble calcium salts, there may be mentioned di- or tri calcium phosphates and calcium sulphates which because of their low solubility can be added liberally without greatly affecting the number of calcium ions available. The preferred source of calcium ions is calcium sulphate dihydrate. The preferred amount of added calcium as calcium salts is with the range of 0.2% to 4%, more preferably 1% to 2%, of the weight of the system, with the amount added depending on the amount of alginate or pectate in the system.

The amount of calcium ions in the system should preferably be sufficient to react stoichiometrically with the alginate or pectate and generally will be higher than that amount. For calcium sulphate dihydrate the weight used is generally at least half and may be up to at least four times the weight of alginate or pectate present.

The requirement for the addition of calcium ions as calcium salt can be met at least partially by the use in the gelling system of calcium rich materials such as milk.

The variable parameters of the gelling system include the concentration and type of alginate and/or pectate, sequestrant and calcium source as well as the presence of other ions and the p.H. Adjustments of these variables to produce a hot gelling system is within the skill of the man skilled in the art once he has been made aware that the hot forming gels according to the invention can be made. Gelling systems having threshold temperatures of from 50° to at least 130° C. can be produced by suitable selection of the variables. However, even a rise in temperature of the order of 10° C., say from 20° C. to 30° C., has a dramatic effect on the rate of gel formation, which may be at least doubled even by such a small rise in temperature.

In operation of the invention, the alginate or pectate and the sequestrant are preferably mixed in an aqueous medium and allowed to stand prior to admixture with the calcium ion source. This is particularly important if meat is to be used for its sequestring activity and no added sequestrant is used.

The systems of the invention are particularly suitable for use in the preparation of textured products.

Products can be produced for example by casting a mixture onto a heated drum drier on which it is partially heat set and scraping the product off the drum using a doctor blade to give a rippled appearance. Full gelling of the product occurs under continued heating. Setting the gelled product in a heated mono pump will also provide texture to the product. It is also possible to pass a thin sheet of material vertically through an infra red heater and allow the gelled or partially gelled product to fall back on itself in layers so that the layers remain separate and the product is highly textured.

The mechanisms underlying the invention are not understood.

The amount of sequestrant used is higher than that conventionally used for a cold setting system having a similar setting time. It is though possible that with these levels of sequestrant the reaction kinetics are such that at low temperatures the rate of the sequestring reaction is very much greater than the rate of reaction of calcium with the alginate or pectate so that gelling is prevented.

At higher temperatures these rates of reaction are reversed so that available calcium ions, which may be released from sequestring or may never have been sequestred, preferentially react with the alginate or pectate.

Alternatively, the sequestrant may undergo a chemical change on heating, with consequential reduction of sequestring activity. It is known from the literature that tetra sodium and tetra potassium pyrophosphate have a tendency to convert to tri sodium and potassium phosphate, respectively, on heating.

The hot forming gels of the invention can be formed in the presence or absence of a food phase. Preferably the gels are formed in the presence of a food phase such as cooked or raw meat, including fish and fowl, fruits vegetables or cereals.

The following examples illustrate the invention.

EXAMPLE 1

Example of a poultry product

The Mixtures

A mixture was prepared containing 536 g ground poultry necks (1 mm), 14 g guar gum and 120 g water. The mixture was brought to pH 7 by the addition of 1 g sodium bicarbonate and had 20 g calcium sulphate dihydrate added (Mixture A).

A second mixture was prepared containing 10 g sodium alginate (e.g. Protan SF-40), 0.75 g tetra potassium pyrophosphate and 320 g water. (Mixture B).

Mixtures A and B were blended at 10° C. In this condition the mix can be retained fluid for upward of 4 hours.

The Process

Aliquots of the blend (200 g) were dropped into a water bath at 60°–70° C. This formed an instantaneous reaction at the interface resulting in skinning and initiation of internal texturisation of the pieces. The pieces were flumed from bath and passed through a mincer (e.g. Hobart) fitted with 50 mm plates. Passage through the mincer resulted in size reduction and distortion of the chunks. Finally the material was extruded into a hot water bath at 70° C. and held for 1 minute before draining.

The material thus formed was then incorporated in a conventional canned petfood product.

EXAMPLE 2

Example of fish product

Mixture A was prepared using 3.15 Kg comminuted cod material to which 20 g sodium bicarbonate and 200 g calcium sulphate dihydrate was added and mixed. Mixture B contained 133 g sodium alginate (Protan SF-40), 400 g tetra potassium pyrophosphate and 6.517 Kg water. Mixtures A and B were blended as described in example 1. The blend was conveyed by screw through the cooled feed chamber (10° C.) of an extruder to an extrusion head shaped to give the desired aesthetic appearance to the formed chunk. For example, the cavity profile can be designed to give the appearance of a fish shape to the passing stream. The extrusion head and die is preheated to give a surface temperature of 80° C. to the passing alginate stream. Skinning occurs giving the desired profile to the stream. The extrusion rope formed is cut into individual fish-shaped pieces and passed onto the belt of an infra red oven where it attains an internal temperature of 70° C.

The material thus formed was packed in a white sauce and chilled prior to use as a microwavable convenience food.

EXAMPLE 3

Example of a vegetable product

Mixture A of example 1 was prepared with the chicken replaced with comminuted onion. Mixtures A and B were blended as described in example 1. The blend was passed through an extruder as described in example 2 where the heated extruder die (70° C.) was designed to form the rope into a hollow tube. A cutter blade then removed individual rings from the rope which were very rapidly heated to 80° C. in a continuous microwave tunnel. The individual onion rings were then optionally enrobed in batter, as known in the art, before individually quick freezing the rings as a convenience vegetable product.

EXAMPLE 4

Example of a fruit product

As example 1 but replacing the chicken with a pureed fruit material such as apple in mixture A. Mixture B was also modified in that 180 g sucrose was added as an extra component to the mix. The mixtures were blended and processed as described in example 1. In this fashion a pie filling with improved aesthetics over conventionally cold formed alginate pieces can be made.

EXAMPLE 5

Example of a liver product

A gravy was prepared at 10° C. containing 14 g sodium alginate (e.g. Protan HF40), 0.34 g tetra potassium pyrophosphate and 660 g water (Mixture A). A second mixture was prepared containing 300 g minced (2 mm) poultry liver, 20 g calcium sulphate dihydrate and 10 g dried blood (Mixture B).

Mixtures A and B were brought together at 10° C. and spread onto the belt feeding a continuous oven. As the material passes through the tunnel the temperature of the mixture rises to 90° C. initiating the alginate gelation process. The set material is size reduced and heat processed in gravy in a conventional canned petfood product. Both before and after cooking the alginate formed piece has excellent aesthetics with the mouthfeel, flavour and appearance of liver.

EXAMPLE 6

Example of a beef product

A gravy was prepared containing 27 g sodium alginate (e.g. Protanal SF40), 0.6 g Tetra sodium pyrosphate and 1300 g water (Mixture A).

A second mixture was prepared containing 625 g of an equal blend of minced (1 mm) udders, tripes and kidney of bovine origin. To this blend was added 4 g of sodium bicarbonate and 40 g of calcium sulphate dihydrate. (mixture B)

Mixtures A and B were intimately blended at 5° C. and a film of the material applied to the heated surface of a rotating cylinder. Surface temperature and residence time are controlled to give a film temperature of 70° C. The material is removed from the rotating cylinder by a doctor blade angled to impart a crimped or rippled effect to the sheet. The sheet can be allowed to fold back on itself to give the desired thickness of material. In this manner a textured product can be achieved with the aesthetic appearance of muscle meat. The material formed can be diced, cubed or shredded to give the desired piece size and heat processed in a canned petfood formulation.

EXAMPLE 7

Example of a fruit Jelly

Mixtures A and B were prepared as described in example 4 with the variation that the apple puree was replaced with strawberry puree. The mixtures were blended and heated to 80° C. in a microwave oven. The mixture gelled to give a table jelly like product.

EXAMPLE 8

Example of a coextruded meat product

Mixtures A and B were prepared as described in example 1 with the variations that the chicken in mixture A was replaced with finely minced pork and that mixture B had 18 g of wheat flour added. Mixtures A and B were mixed together and heated to 40° C. immediately prior to use.

Mixture C was prepared using 533 g minced pork mixed with 120 g water and 13 g guar.

Mixture C was extruded as a continuous sausage onto a moving belt. Simultaneously, mixture A/B was coextruded around mixture C to enrobe the inner meat phase. The coextruded mixtures were passed through a continuous oven with the conditions controlled to give an internal product temperature of 92° C.

EXAMPLE 9

Example using cooked meats

A mixture of minced offal meats were pre-cooked by heating to 100° C. for 10 minutes. They were cooled to 10° C. and then finely comminuted. Mixture A was prepared using 4.25 Kg cooked meats together with 10 g sodium bicarbonate and 100 g calcium sulphate dihydrate. Mixture B contained 50 g sodium alginate (Protan LF-20), 3.5 g tetra sodium pyrophosphate and 590 g water. Mixtures A and B were blended together, pumped onto a conveyor belt and passed into an oven where an internal temperature of 80° C. was reached. The material was sliced and then incorporated into a conventional canned petfood product.

EXAMPLE 10

Example omitting food phase

Mixture A was prepared using 20 g calcium sulphate dihydrate, 10 g guar and 970 g water. Mixture B comprised 20 g sodium alginate, 6 g tetra sodium pyrophosphate and 974 g water. A and B were mixed together at 10° C. and extruded through a 1 mm die into a water bath at 90° C. Gelling of the fibres occured almost instantaneously.

EXAMPLE 11

Example using hot oil

Mixtures A and B were prepared as example 1 and mixed together at 10° C. The mixture was pumped into a stream of hot olive oil at 120° C. and then passed through a Mono pump. In contact with the hot oil, rapid setting occurred with randomly shaped pieces of about 30 g generated in the mono pump. The hot oil was separated and recycled. The chunks were incorporated into a conventional petfood products whereby the remaining surface oil improved chunk separation and ease of filling.

EXAMPLE 12

Example using a heated Mono Pump

Mixtures A+B was prepared as example 11 at 10° C. This mixture was fed directly into a heated Mono pump. The Mono pump was jacketted with steam circulation giving the Mono pump an internal temperature of 95° C. which rapidly set the material on contact. The resultant product had similar appearance to example 11 and was used in a conventional petfood product.

EXAMPLE 13

Example using pectate.

Example 1 is repeated using an equivalent amount of sodium pectate in place of the sodium alginate and 2.5 g of tetra potassium pyrophosphate in place of 0.75 g.

Equivalent results are obtained.

EXAMPLE 14

Example using potassium alginate.

Example 1 was repeated using potassium alginate in place of sodium alginate.

Equivalent results were obtained.

We claim:

1. A method for producing a coherent fully gelled product using a gelling system comprising alginate or pectate, or mixtures thereof, calcium ions and a calcium ion sequestrant, which comprises producing an aqueous mixture containing an effective amount of a gelling agent selected from the group consisting of water soluble or water dispersible gellable alginate, pectate, and mixtures thereof, a thermolabile calcium ion sequestrant which sequestrant is present in an amount of from 1 to 70% by weight based on the weight of calcium ions to be added, and mixing an effective amount of a sparingly water soluble calcium ion source into said mixture at a temperature at least 10° C. below the threshold temperature for the gelling system, which threshold temperature is below 130+ C., and raising the temperature of the mixture at least to the threshold temperature to cause gelation.

2. A method for producing a homogeneously gelled product containing calcium alginate, calcium pectate or mixtures thereof, which comprises producing a first aqueous mixture containing an effective amount of a gelling agent selected from the group consisting of water soluble or water dispersible alginate, pectate, and mixtures thereof, and a thermolabile calcium ion sequestrant, which sequestrant is present in an amount of from 1 to 70% by weight based on weight of calcium ions to be added, forming a second mixture comprising an effective amount of a sparingly water soluble calcium ion source and bringing said mixtures together to form a gelling system at a temperature at least 10° C. below the threshold temperature for the gelling system, which threshold temperature is below 50° C. and then raising the temperature of said mixture at least to the threshold temperature to release calcium ions for reaction with the gelling agent with resultant gel formation.

3. A process for the production of a textured wholly gelled product containing calcium alginate, calcium pectate, or mixtures thereof, which comprises forming a first mixture comprising an effective amount of a gelling agent selected from the group consisting of alginate, pectate and mixtures thereof and a thermolabile calcium ion sequestrant, which sequestrant is present in an amount of from 1 to 70% by weight based on weight of calcium ions to be added, forming a second mixture including an effective amount of a sparingly water soluble calcium ion source, bringing the two mixtures together to form a gelling system at a temperature at least 10° C. below the threshold temperature for the gelling system, which threshold temperature is below 130° C., subjecting the mixture, under texturising conditions to heating to a temperature which is at least the threshold temperature, such as to cause formation of a gel on at least the surface portion of the product whereafter gelation proceeds throughout the product.

4. A process for the production of a gelled product containing calcium alginate, calcium pectate, or mixtures thereof, which comprises forming a first mixture of an effective amount of a gelling agent selected from the group consisting of alginate, pectate and mixtures thereof, and a thermolabile calcium ion sequestrant, which sequestrant is present in an amount of from 1 to 70% by weight based on weight of calcium ions to be added, forming a second mixture including an effective amount of a sparingly soluble calcium ion source, bringing the two mixtures together to form a gelling system at a temperature at least 10° C. below the threshold temperature for the gelling system, which threshold temperature is below 130° C., and then raising the temperature of the mixture to at least said threshold temperature to cause release of calcium ions for reaction with the gelling agent thereby causing substantially instantaneous gelling of the product.

5. A method according to claim 1, wherein the calcium ion sequestrant is at least partially provided by calcium sequestring food.

6. A method according to claim 1, wherein the calcium ion sequestrant is sodium or potassium pyrophosphate.

7. A method according to claim 1, wherein the calcium ion source is calcium sulphate dihydrate.

8. A method according to claim 2, wherein the calcium ion sequestrant is at least partially provided by calcium ion sequestring food.

9. A method according to claim 3, wherein the calcium ion sequestrant is at least partially provided by calcium ion sequestring food.

10. A method according to claim 4, wherein the calcium ion sequestrant is at least partially provided by calcium ion sequestring food.

11. A method according to claim 1, wherein the calcium ion sequestrant is sodium or potassium pyrophosphate.

12. A method according to claim 2, wherein the calcium ion sequestrant is sodium or potassium pyrophosphate.

13. A method according to claim 3, wherein the calcium ion sequestrant is sodium or potassium pyrophosphate.

14. A method according to claim 4, wherein the calcium ion sequestrant is sodium or potassium pyrophosphate.

15. A method according to claim 1, wherein the calcium ion source is calcium dihydrate.

16. A method according to claim 2, wherein the calcium ion source is calcium sulphate dihydrate.

17. A method according to claim 3, wherein the calcium ion source is calcium sulphate dihydrate.

18. A method according to claim 4, wherein the calcium ion source is calcium sulphate dihydrate.

* * * * *